(12) United States Patent
Kowarz et al.

(10) Patent No.: US 7,061,661 B2
(45) Date of Patent: Jun. 13, 2006

(54) ELECTROMECHANICAL DISPLAY PANEL INCORPORATING A POROUS MOVABLE FILM

(75) Inventors: Marek W. Kowarz, Henrietta, NY (US); Marcus S. Bermel, Pittsford, NY (US); Robert F. Cournoyer, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/702,898

(22) Filed: Nov. 6, 2003

(65) Prior Publication Data
US 2005/0099669 A1 May 12, 2005

(51) Int. Cl.
*G02B 26/00* (2006.01)

(52) U.S. Cl. ........................ 359/291; 359/290
(58) Field of Classification Search ................ 359/290, 359/291, 247, 267, 223, 224, 846, 847, 230, 359/231
See application file for complete search history.

(56) References Cited

U.S. PATENT DOCUMENTS

| 4,113,360 | A | 9/1978 | Baur et al. |
| 5,751,469 | A | 5/1998 | Arney et al. |
| 5,771,321 | A | 6/1998 | Stern |
| 5,808,781 | A | 9/1998 | Arney et al. |
| 6,351,329 | B1 * | 2/2002 | Greywall ................ 359/290 |
| 6,525,483 | B1 | 2/2003 | Van Gorkom et al. |

FOREIGN PATENT DOCUMENTS

WO 99/28890 6/1999

OTHER PUBLICATIONS

U.S. Appl. No. 10/668,421, filed Sep. 23, 2003, Bermel et al.
M. G. da Silva, et al., "Gas Damping and Spring Effects On MEMS Devices With Multiple Perforations And Multiple Gaps," Transducers '99, Jun. 7-10, 1999 Sendai, Japan, pp. 1148-1151.
Thomas B. Gabrielson, "Mechanical-Thermal Noise in Micromachined Acoustic and Vibration Sensors," IEEE Transactions on Electron Devices, vol. 40, No. 5, May 1993, pp. 903-909.

* cited by examiner

*Primary Examiner*—Loha Ben
*Assistant Examiner*—Jack Dinh
(74) *Attorney, Agent, or Firm*—Stephen H. Shaw

(57) ABSTRACT

An electromechanical display panel that includes at least two spatially separated plates. Between the at least two spatially separated plates is a suspended porous movable film having a pore area, wherein the pore area comprises less than 50% of surface area of the porous movable film. The electromechanical display panel also includes a means for moving the porous movable film between the at least two spatially separated plates to cause selective light modulation.

16 Claims, 11 Drawing Sheets

ELECTROMECHANICAL DISPLAY PANEL INCORPORATING A POROUS MOVABLE FILM

FIELD OF THE INVENTION

This invention relates generally to an electromechanical light modulation device that contains a thin movable film, and more particularly, to an improved flat panel display incorporating a light-modulating movable film.

BACKGROUND OF THE INVENTION

In U.S. Pat. No. 4,113,360 issued Sep. 12, 1978 to Giienter Bauer et al., titled "Indicating Device For Illustrating Symbols Of All Kinds," a display panel is disclosed comprising a first plate acting as a light guide or fluorescent material, a second plate positioned some distance apart from the first plate, and a thin movable film situated between the two plates. The movable film is flexible and can be made to locally contact the first plate and allow light to be transmitted from the first plate into the film. If the film is constructed to scatter the light, then the movable film acts as a light modulator, or optical switch, to create bright and dark regions on the plates as the film contacts or separates from the first plate, respectively. Rapid contact and separation of the film from the first plate can be used to create gray regions.

Bauer et al. teach controlling the film's movement by electrical means. For example, the film may contain a very thin layer of indium tin oxide that permits an electrical charge to be applied to the film. Similar conductive layers may be placed on the plates. An electrical bias between the plates and the film produces electrostatic forces that move the film toward or away from the light guide. Alternatively, U.S. Pat. No. 5,771,321 issued Jun. 23, 1998 to Ernest Stern, titled "Micromechanical Optical Switch And Flat Panel Display," describes an electromechanical means of controlling the film's movement, with an electrical bias providing an attractive electrostatic force and the film deformation providing a mechanical restoring force.

Typically, the plates are rigid with a thickness on the order of millimeters and are comprised of clear materials such as glass or hardened plastic. The film, on the other hand, must be flexible and has thickness on the order of a micron. The film may be comprised of resin material such as polycarbonate or polystyrene as suggested by Stem in U.S. Pat. No. 5,771,321, referenced above.

One drawback to the operation of a display panel described above is that the motion of the movable film may be impeded by an air pressure differential in the spaces existing between the film and the plates. To overcome the air pressure differential, undesirably high voltages are required to move the film. In World Intellectual Property Organization Application Publication No. WO 99/28890, by Gerardus Van Gorkom, published on Jun. 10, 1999, and titled "Display Device Comprising A Light Guide," a means of minimizing pressure differential is proposed whereby the movable film is situated in an evacuated space. Van Gorkom discloses applying a vacuum of preferably less than 10 Torr (0.013 atm) to the chambers inside the display panel. However, a highly evacuated system is difficult to fabricate and is vulnerable to air leakage during the lifetime of the display panel operating at ambient conditions. Moreover, an evacuated system precludes the use of plastic plates in the display panel since plastic materials are permeable to ambient gases such as nitrogen, oxygen, and water. Because rigid glass plates would be required to maintain a vacuum inside the display panel, a flexible plastic display panel is not possible using Van Gorkom's teachings. Therefore, it remains highly desirable to have a movable film display that does not require an evacuated system.

Unlike the movable film devices described by Van Gorkom, most optical micro-electromechanical systems (MEMS) are packaged at near atmospheric pressure, with gaps at the periphery of movable elements providing a gas exit path. As described by Susanne C. Arney et al. in U.S. Pat. No. 5,751,469, issued May 12, 1998, titled "Method And Apparatus For An Improved Micromechanical Modulator," and U.S. Pat. No. 5,808,781, issued Sep. 15, 1998 (also to Susanne C. Arney et al.), titled "Method And Apparatus For An Improved Micromechanical Modulator," additional pores, or holes, can be used to improve etching of a sacrificial material and to fine tune the dynamic response by providing additional gas venting. The devices described in '469 and '781 are substantially smaller in total area than movable film displays and are fabricated with semiconductor-like processes, with the pores patterned using photolithography. During the pore patterning process, the sacrificial material provides rigid support for the movable elements. In '469 and '781, the pores are only placed outside of the active optical area to prevent any deterioration in optical performance. The pore geometry (pore size and placement) is chosen to provide optimal damping of ringing that occurs at the resonant frequency of the movable element.

The optical MEMS approach described in '469 and '781 and related art for providing gas-venting pores is, however, not suitable for large-area movable film displays for several reasons.

1. Fabrication Difficulties: Photolithographic patterning is not well suited for forming pores in the movable film, because the film is suspended over a series of spacers without employing a sacrificial layer at all. The suspended movable film is too fragile to allow photolithographic processes and, prior to assembly, the movable film (and any carrier) is too flexible for precise photolithographic exposures. Furthermore, distortion of the movable film would be likely to occur during wet photolithographic process steps, along with an increase in defects and particle contamination. Etch processes are also not well developed for polymeric films.

2. Pore Placement: The active optical area is preferably a very large portion of the movable film area. In addition, for low-cost assembly, it is preferable not to have a critical alignment between the movable film and the spacers. Both of these factors make it impractical to only place pores outside the active optical area.

3. Performance Criteria: The primary electromechanical performance parameters for large-area movable film displays are switching time and operating voltage, not optimal damping of ringing.

There is a need therefore for a movable film display that does not require an evacuated system, that is manufacturable and that has good optical performance combined with a fast switching time and low operating voltage.

SUMMARY OF THE INVENTION

The aforementioned need is met according to the present invention by providing an electromechanical display panel that includes at least two spatially separated plates; a porous movable film suspended between the at least two spatially separated plates and having a pore area; wherein the pore area comprises less than 50% of surface area of the porous movable film; and means for moving the porous movable film between the at least two spatially separated plates to cause selective light modulation.

Another aspect of the present invention provides an electromechanical display panel having a switching time less than 100 microseconds, and that includes: at least two spatially separated plates; a porous movable film suspended between the at least two spatially separated plates; a gas, having pressure greater than 0.1 atmospheres, residing between the at least two spatially separated plates, and means for moving the porous movable film between the at least two spatially separated plates to cause selective light modulation.

A third aspect of the present invention provides an electromechanical light modulation device, including at least two spatially separated plates; wherein at least one of the spatially separated plates has a first thin conductive layer; plus a porous movable film suspended between the at least two spatially separated plates; wherein the porous movable film has a translationally-invariant pore structure and includes a second thin conductive layer; and wherein the application of a voltage between the first thin conductive layer and the second thin conductive layer causes motion of the porous movable film. And finally, there is a gas, having pressure greater than 0.1 atmospheres, residing between the at least two spatially separated plates.

A fourth aspect of the present invention provides an electromechanical light modulation device that includes at least two spatially separated plates; a porous movable film suspended between the at least two spatially separated plates; and a gas, having pressure greater than 0.1 atmospheres, residing between the at least two spatially separated plates.

DETAILED DESCRIPTION OF THE INVENTION

Figure 1A:
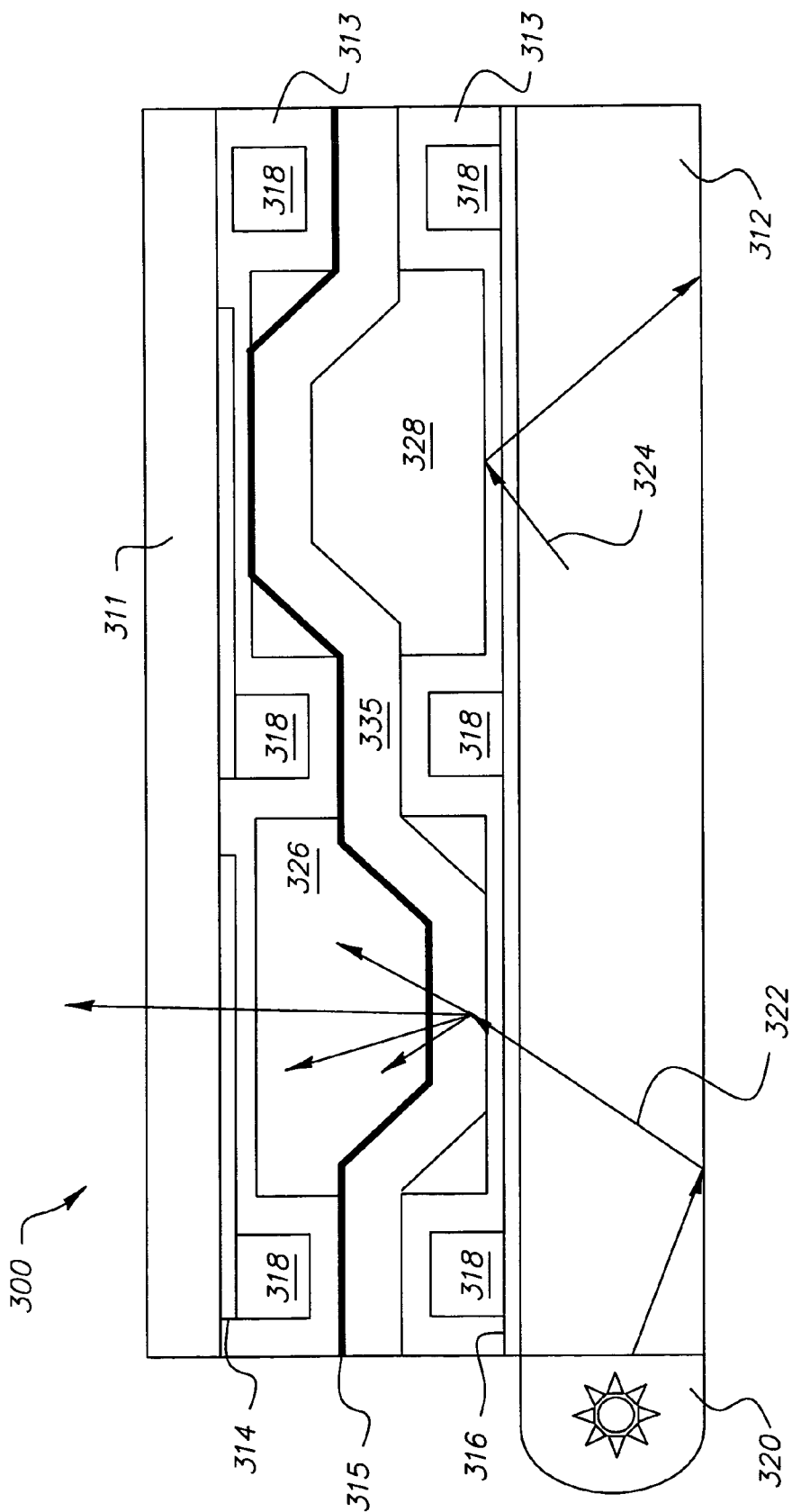
FIG. 1a is a schematic of a display panel with a solid movable film as taught in prior art.

Briefly stated, the foregoing and numerous other features, objects and advantages of the present invention will become readily apparent upon review of the detailed description, claims, and drawings set forth herein. These features, objects and advantages are accomplished by replacing the solid film, used as the movable switch element in prior art display panels, with the porous movable film of the present invention. This novel porous movable film allows gases (e.g. air) to flow freely among compartments in the display panel, during movement of the film. The pressure differential across the movable film is thus minimized. Additionally, operation of the display panel is possible using low switching potentials, with the air pressure inside the display panel at ambient pressure. Thus, the display panel may be operated at internal pressures well above 10 Torr (0.013 atm). Since evacuation of the internal compartments in the display panel is not required, the porous movable film of the present invention also permits the use of plate materials, such as thin flexible plastic materials, that are permeable to ambient gases such as nitrogen, oxygen, and water. As a result, thin flexible display devices can be manufactured using the porous movable film of the present invention.

FIG. 1 shows a flat display panel 300, known in prior art, that contains a solid transparent movable film 335 situated between two rigid plates 311 and 312. Typically, the plates are a transparent material, such as glass, with one plate 312 acting as a guide for light emitted from source lamp 320. Plates 311 and 312 have thin electrically conductive layers 314 and 316, respectively. One suitable conductive material for electrically conductive layers 314 and 316 is indium tin oxide. Electrically conductive layers 314 and 316 are electrically isolated from the movable film by an insulating layer 313, for example, silicon dioxide or aluminum oxide. The solid movable film 335 is positioned between plates 311 and 312 by means of spacers 318 to form a gap between plates 311 and 312 on the order of several microns. In addition, the movable film 335 also contains a thin transparent electrically conductive layer 315, such as indium tin oxide, as well as an internal light scattering means, such as dispersed titanium dioxide particles. During operation, the movable film 335 may be moved toward or away from the light guide plate 312 by varying the electrical potential between the light guide plate 312 and the movable film 335. As depicted in compartment 326 of FIG. 1, light 322 inside of light guide plate 312 is emitted when the movable film 335 contacts plate 312. On the other hand, light 324 remains inside the light guide plate 312 when movable film 335 does not contact light guide plate 312, as illustrated in compartment 328. For the case illustrated in compartment 328 of FIG. 1, no light is emitted. By controlling the movement of movable film 335 into contact with light guide plate 312 and away from light guide plate 312, bright and dark regions can be made on optical display panel 300. Adjusting the rate of contact between the movable film 335 and the light guide plate 312 creates gray scale. In general, switching times of less than a millisecond are desirable.

As described in WO 99/28890 issued to Van Gorkom, a low voltage potential difference of less than 50 volts is desirable to move the film between the two plates. To operate at such low potentials, Van Gorkom teaches the use of a vacuum of less than 10 Torr (0.013 atm) in compartments 326 and 328. Without vacuum, the potential difference required to move film 335 is objectionably high at approximately 500 volts, at atmospheric pressure. To maintain a vacuum in the display panel 300, plates 311 and 312 must be impermeable to ambient gases (e.g. nitrogen, oxygen, and water).

Figure 1B:
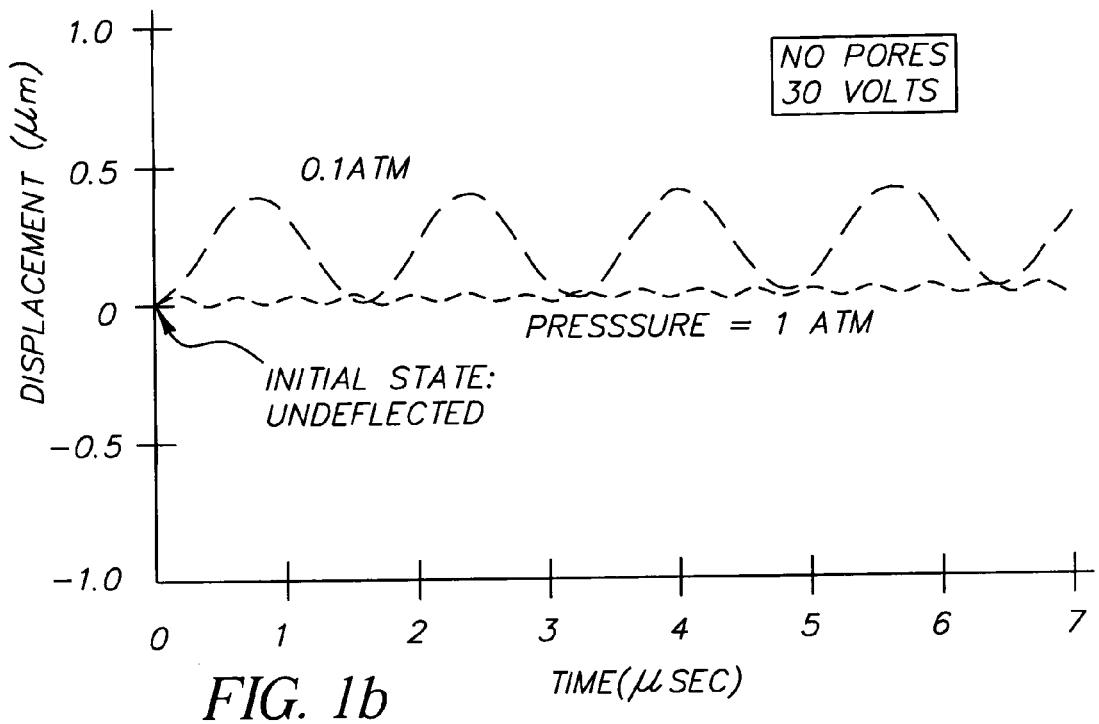
FIG. 1b depicts the step response of a solid movable film at atmospheric pressure and at 0.1 atmospheres.
Figure 1C:
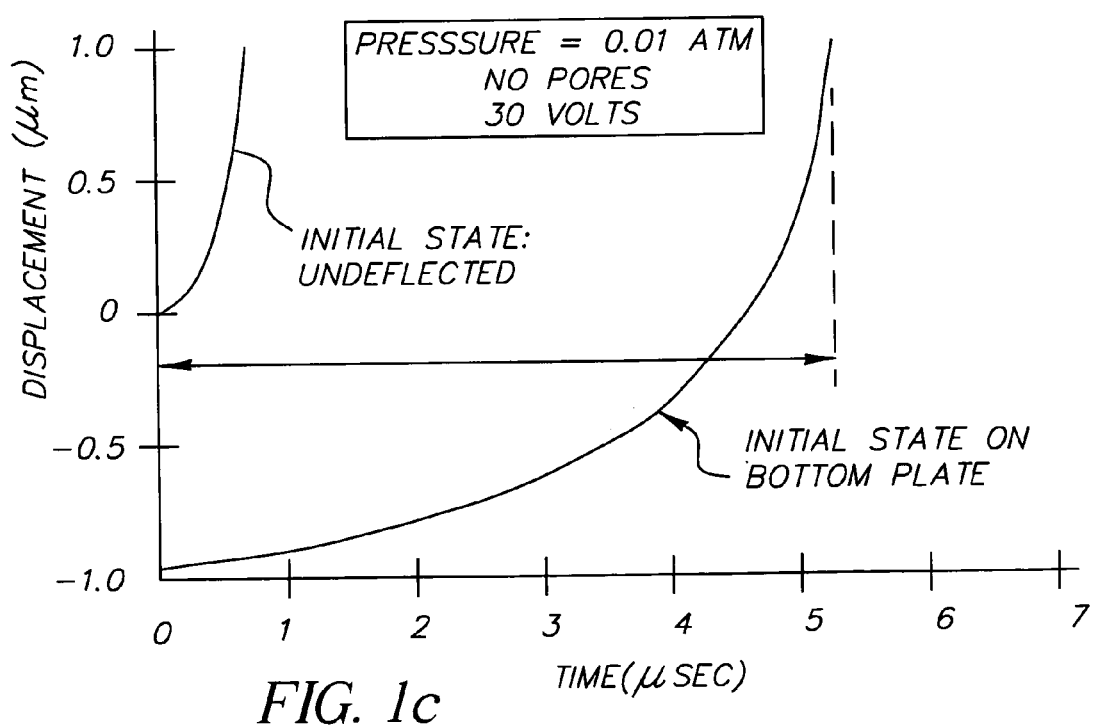
FIG. 1c depicts the step response of a solid movable film at 0.01 atmospheres.
Figure 1D:
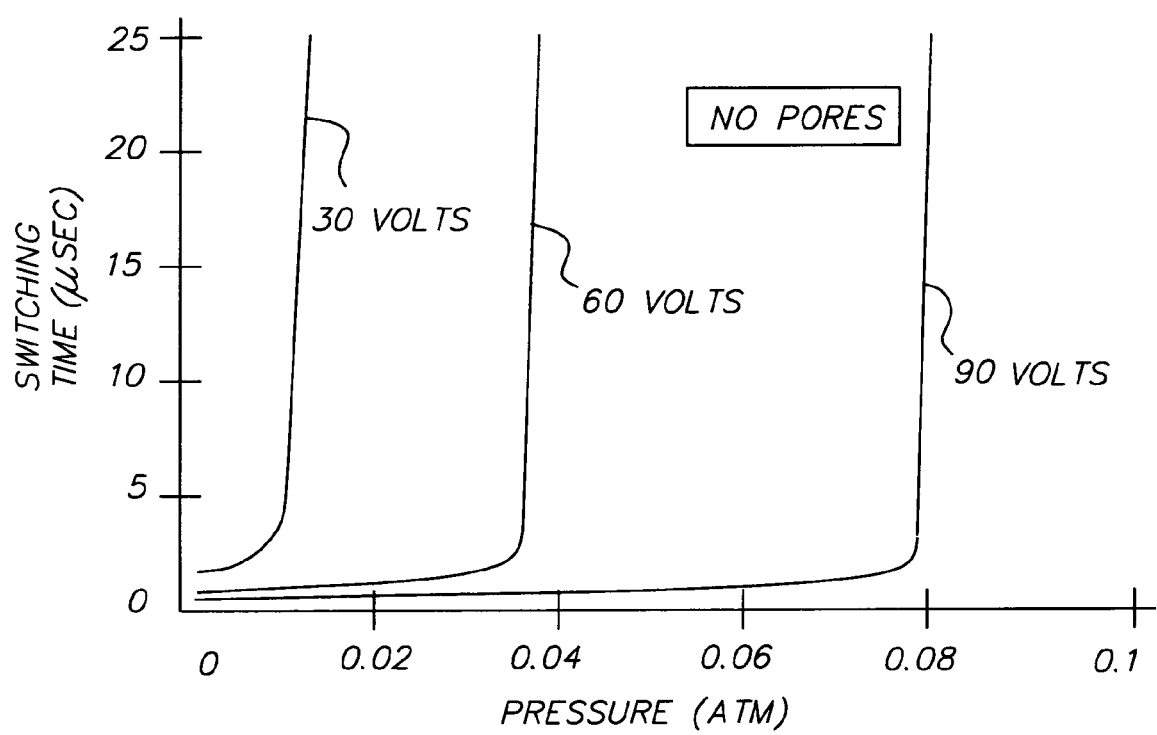
FIG. 1d shows plots of the switching time as a function of pressure for a solid movable film.

FIGS. 1b, 1c, and 1d illustrate the dynamic electromechanical operation of a display panel 300 with a solid movable film display of the type described in the prior art and depicted in FIG. 1a. In these calculated plots, the movable film 335 is cellulose triacetate, with a thickness of 0.8 μm, that is separated from the top plate 311 and bottom plate 312 by 1 μm air-filled gaps. The insulating layers 313 are 1.5 μm of aluminum oxide. Each pixel of the display is 150 μm by 450 μm in size. The device model used to calculate FIGS. 1b, 1c, and 1d assumes that the movable film display is filled with an isothermal and compressible gas.

FIGS. 1b and 1c show the calculated average displacement of the movable film 335 when a 30 volt potential difference is applied at time=0 between the thin transparent electrically conductive layer 315 on the movable film 335 and the conductive layer 314 on the top plate 311. For this step response illustration, the thin transparent electrically conductive layer 315 is taken to be at the same potential as the conductive layer 316 on the bottom plate 312. As described by Gerardus G. P. Van Gorkom et al in U.S. Pat. No. 6,525,483, issued Feb. 25, 2003, titled "Display Device Comprising A Light Guide With Electrode Voltages Dependent On Previously Applied Electrode Voltages," a more complex driving scheme can take advantage of the inherent bistability in the response of the movable film 335 to address the individual pixels of the movable film display. In FIG. 1b, the air pressure differential that occurs when the movable film 335 is displaced prevents contact between the movable film 335 and the top plate 311, because the initial pressure is relatively high (1 atm and 0.1 atm). The movable film 335 simply oscillates without switching. When the pressure is reduced to 0.01 atmospheres, the electrostatic force becomes sufficient to overwhelm the pressure differential and the movable film 335 switches into contact with the top plate 311, as shown in FIG. 1c. At 0.01 atmospheres, the switching time is approximately 0.7 μsec when the movable film 335 is initially undeflected and is approximately 5.2 μsec when the movable film 335 is initially in contact with the bottom plate 312. FIG. 1d shows the switching time as a function of pressure for the case when the movable film 335 is initially in contact with the bottom plate 312. As anticipated from the discussion in WO 99/28890, the maximum pressure where switching occurs increases with operating voltage. For example, at 30 volts the maximum pressure is ~0.012 atm (9 Torr), whereas at 90 volts it is ~0.08 atm (61 Torr). Operation at atmospheric pressure requires a voltage in excess of 300 volts, which would require very expensive driver circuitry. In addition, the extreme forces caused by such high voltages would be expected to cause reliability problems.

Figure 2:
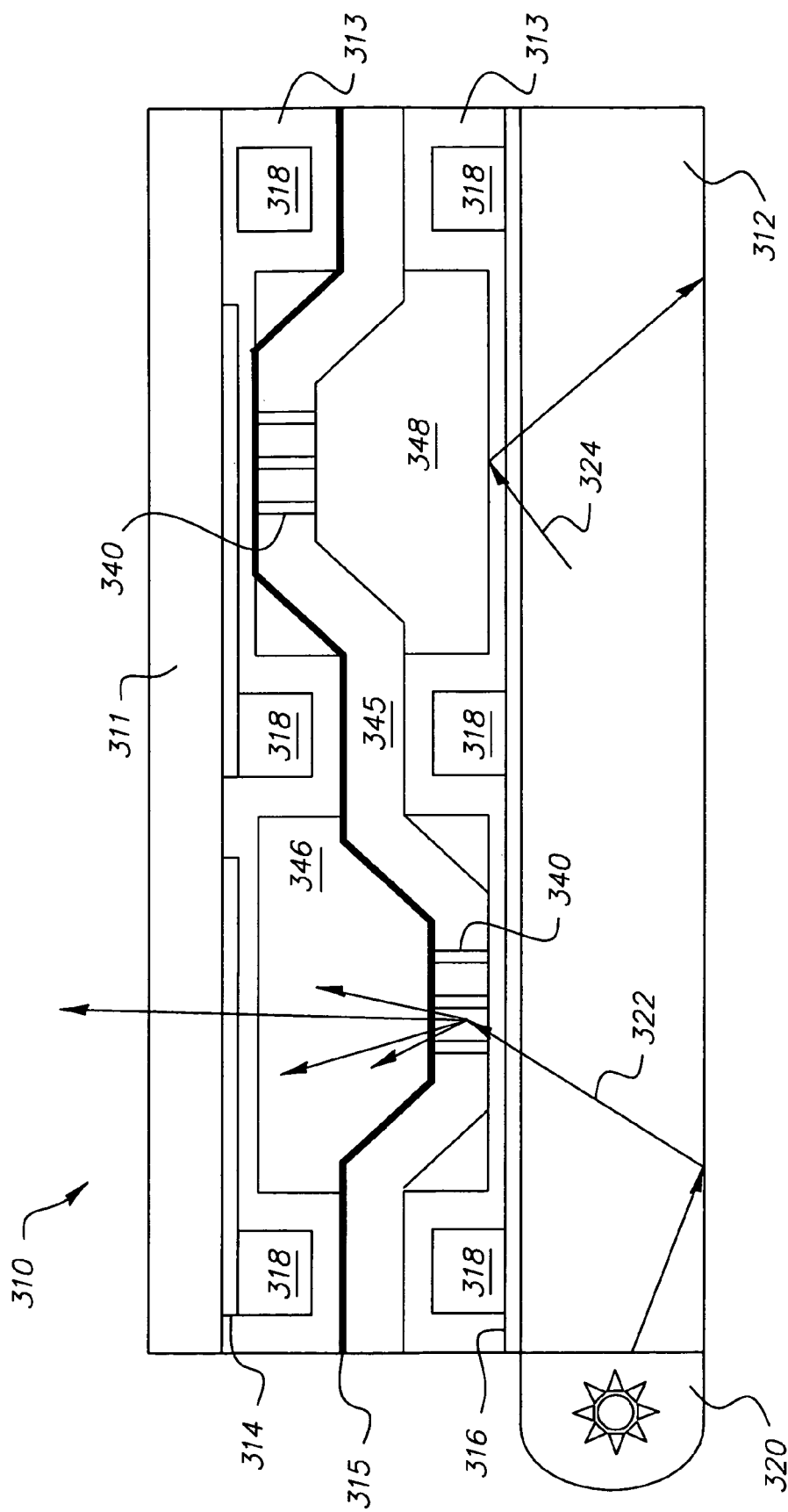
FIG. 2 is a schematic of a display panel using the porous movable film of the present invention.

Referring to FIG. 2, the inventors illustrate an exemplary porous movable film 345, according to the present invention, situated in a new optical display panel 310. For display panel 310, compartments 346 and 348 do not require a vacuum of less than 10 Torr (0.013 atm) to operate at low potentials, since pores 340 in the porous movable film 345 permit movement of gases during switching of the porous movable film 345 between plates 311 and 312. This movement of gases through the porous optical switch 345 is illustrated more clearly in FIG. 3.

Figure 3:
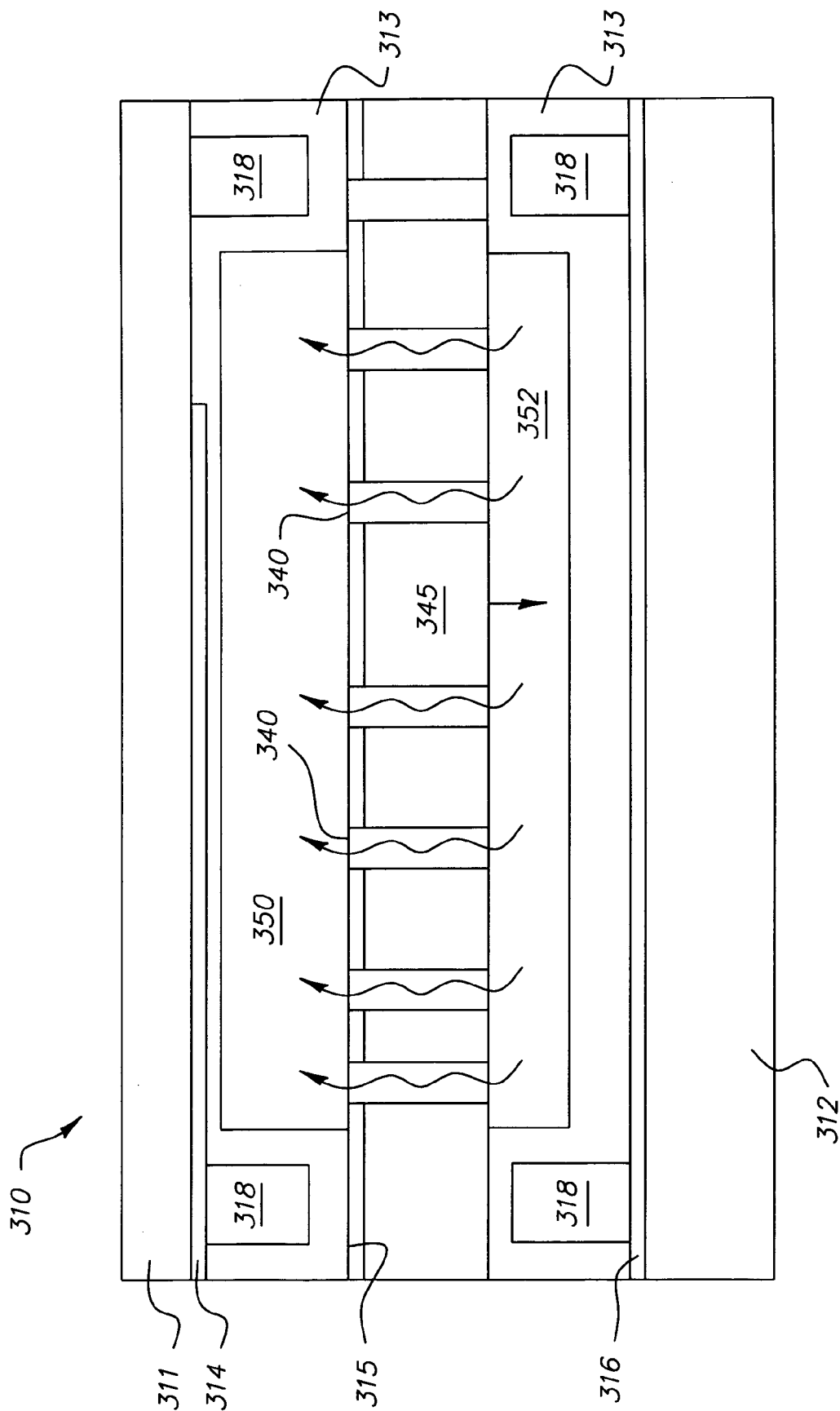
FIG. 3 is a schematic of a display panel using the porous movable film of the present invention.

As shown in FIG. 3, gases from compartment 352 are allowed to pass freely through porous movable film 345 when the porous movable film 345 is in motion from the upper plate 311 to the light guide plate 312. As a result of the free motion of gases through the porous movable film 345, the pressure difference between compartments 350 and 352 is greatly reduced during motion of the film. Therefore, evacuation of compartments 350 and 352 is unnecessary and operation of the optical display panel 310 fat pressures well above 10 Torr is possible even at low switching potentials of less than 50 volts between the porous movable film 345 and plates 311, 312. Moreover, because the use of the porous movable film 345 of the present invention does not require a low vacuum to operate, flexible and lightweight plastic materials may be used as plates 311 and 312. Thus, the porous optical switch device 310, according to the present invention, allows the fabrication of a flexible, simpler, and more portable optical display.

Figure 4:
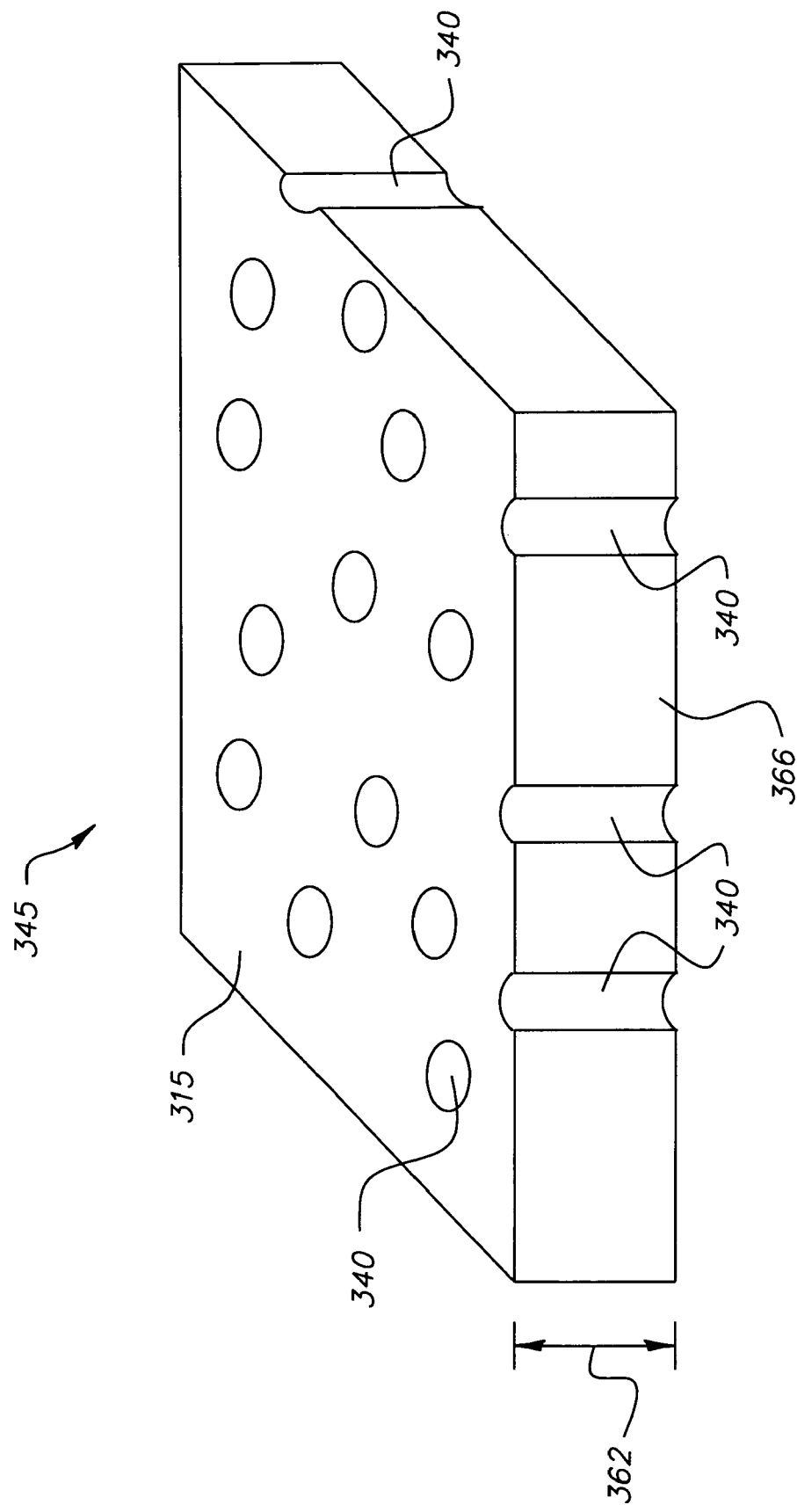
FIG. 4 is a schematic of an exemplary porous movable film of the present invention.

FIG. 4 illustrates the porous movable film 345 more closely. As depicted in FIG. 4, pores 340 span the thickness of the movable film 345 to permit the free movement of gas molecules during actuation of the movable film 345 from one plate to the other. To achieve good flexibility, thickness 362 of the porous film 345 is typically thin, e.g. much less than 100 microns and preferably less than 10 microns. In one embodiment of the present invention, thickness 362 of the porous movable film 345 is in the range of 1.0 to 2.0 microns. In addition, the movable film 345 of the present invention may have a light scattering means 366 within the film. In one embodiment of the present invention, the light scattering means 366 fare titanium dioxide particles (TiPure R-706™ is available from DuPont with an average diameter of 0.36 microns). Rutile titanium dioxide has a refractive index of 2.7 and is an excellent light scattering pigment when dispersed into polymeric media having an index of refraction in the range of 1.3–1.7. In another embodiment, the light scattering means 366 are small air pockets or air voids deliberately formed in the polymeric movable film. Air has a refractive index of 1.0 and effectively scatters light in voided films of polymeric materials having a refractive index of 1.3–1.7. In one embodiment of the present invention, the polymer used to form the movable film 345 is both flexible and transparent, with a refractive index that is close to the refractive index of the plate material. Thus, the porous movable films of the present invention are light scattering or light diffusing films and have a light transmission of greater than 50%.

Figure 5:
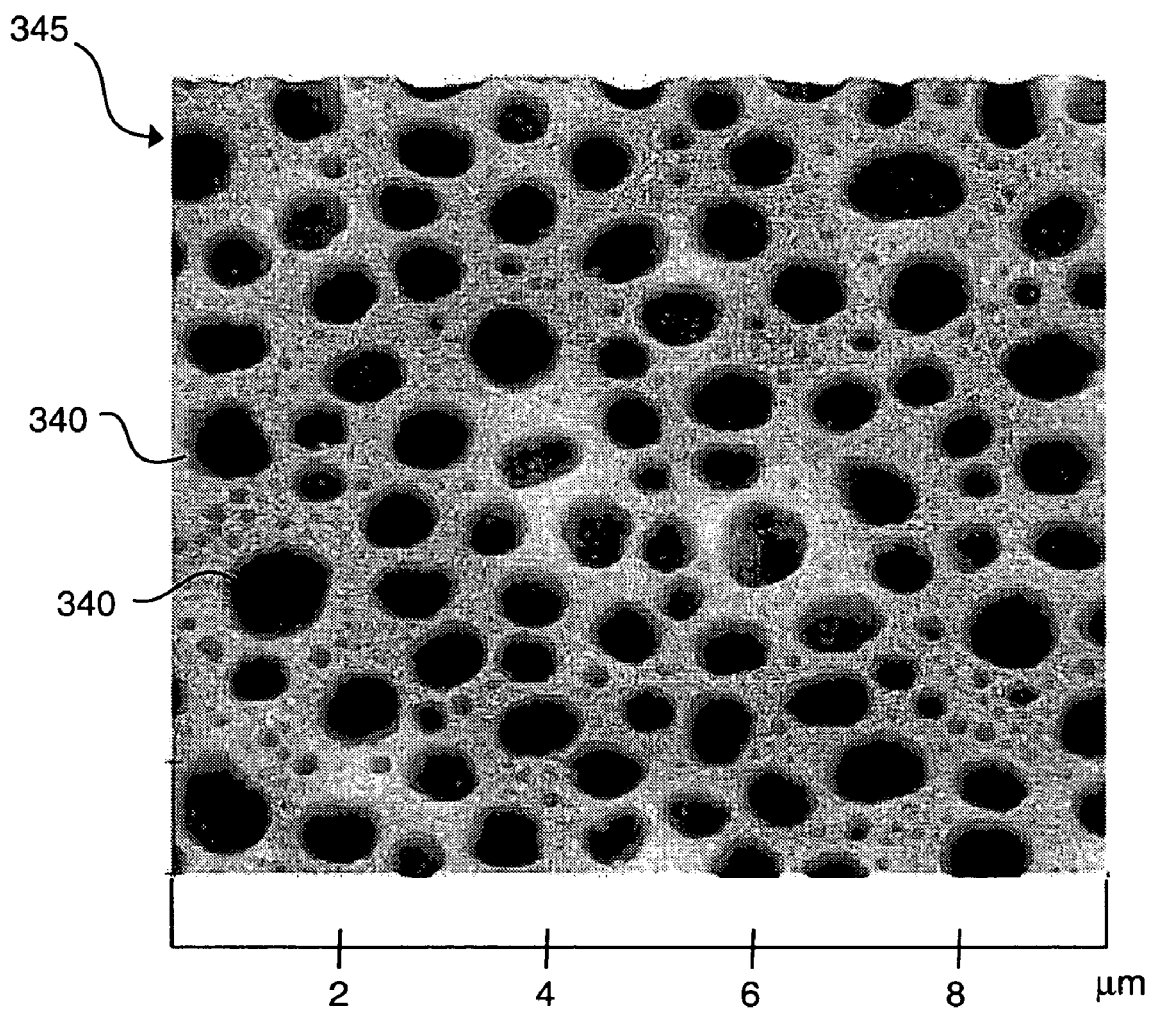
FIG. 5 is an atomic force micrograph of an exemplary porous movable film prepared by bubble nucleation.
Figure 6:
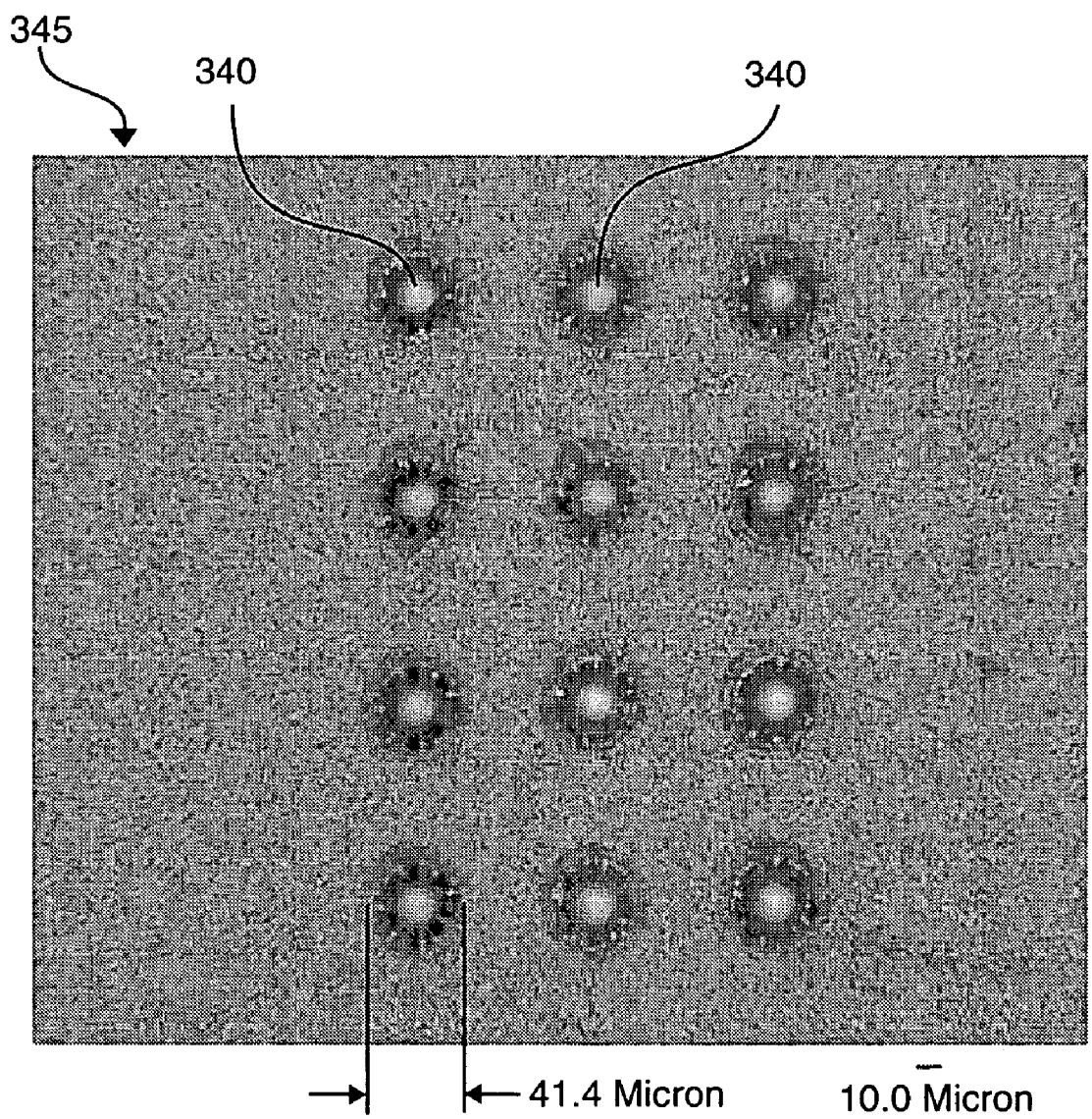
FIG. 6 is a light micrograph of an exemplary porous movable film prepared by laser drilling.
Figure 7:
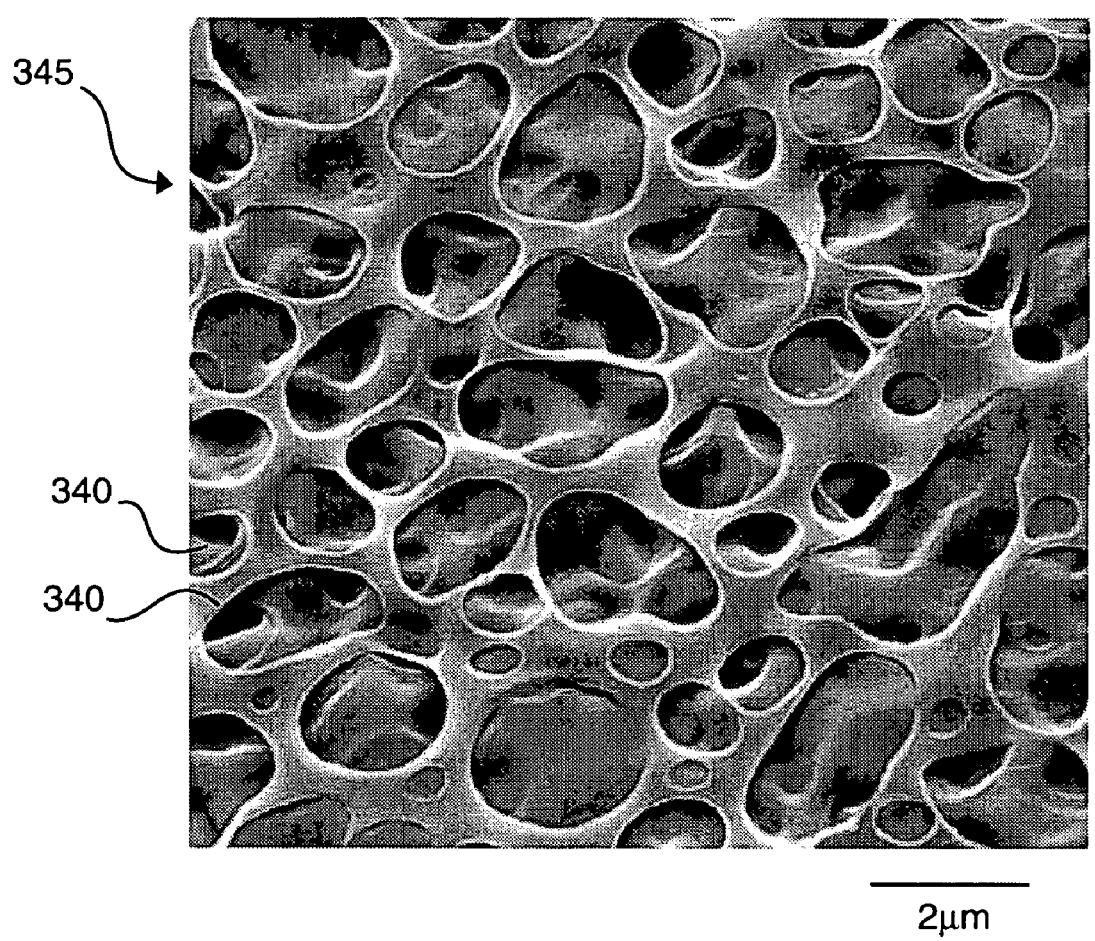
FIG. 7 is a scanning electron micrograph of an exemplary porous movable film prepared using phase inversion.

FIGS. 5–7 shows micrographs of various porous movable films 345 prepared by methods of the present invention as described below. In FIG. 5, a porous movable film 345 is shown with pores that have been formed using a bubble nucleation technique. While the complete mechanism for the formation of the pores shown in FIG. 5 is unclear, it is believed that bubbles are formed by rapidly heating the wet coated layer to induce bubble nucleation in the film 345. When dried and cooled, the bubbles collapse and form a random array of microvoids in a uniform thin film coating with a depth that spans the thickness of the film 345 (0.1–5.0 microns) and a width of 50–2000 nm. Modifying drying temperatures, using co-solvents, varying surfactant concentrations, and adjusting the overall thickness of the layer may control the depth and diameter of the microvoids. Applying a wet coating to a moving carrier substrate and then exposing the coated film to high temperatures volatilizes the coating solvent to form the structure shown in FIG. 5. After drying, the movable film 345 may be peeled from the carrier substrate. Pores 340 formed by this nucleation method are very small on the order of 1 micron in diameter or less. In addition, FIG. 5 shows that the pores 340 are randomly located in the film 345. Additionally, pores formed by the bubble nucleation method are randomly located pores. The sample shown in FIG. 5 is 1.5 microns thick, is formed with cellulose triacetate as the polymer and contains 6 volume percent of titanium dioxide as a light scattering agent.

FIG. 6 shows a light micrograph of porous movable film 345 where pores 340 have been formed by laser drilling an initially solid film. The porous movable film 345 is formed from identical materials as described above. As shown in FIG. 6, pores 340 formed by laser drilling are substantially larger, at approximately 40 microns in diameter, compared to pores prepared by bubble nucleation and previously shown in FIG. 5. Laser drilling offers the ability to create uniform sized pores, as well as the ability to make a controlled pattern of pores, such as the simple square pattern shown in FIG. 6. Moreover, individual pore size may be adjusted as needed, since laser drilling is currently capable of producing pores as small as 2 microns in diameter.

FIG. 7 shows a scanning electron micrograph of a porous movable film 345 prepared by phase inversion. For the phase inversion method, a wet coating containing polymer, solvent, and a low vapor pressure non-solvent is applied to a moving carrier substrate. During drying, the solvent evaporates leaving behind a coating rich in non-solvent that coagulates the polymer thereby forming the porous film structure having pores 340 as shown in FIG. 7. Additionally, pores formed by the phase inversion method are randomly located pores. After drying, the porous movable film 345 may be peeled from the carrier substrate. The peel force of the porous movable film 345 is less than 25 N/m. For the sample shown in FIG. 7, the polymer is cellulose triacetate, the solvent in 1,3-dioxolane, and the non-solvent is water.

Porous movable films with a variety of pore geometries can be fabricated with the processes described above. It will be apparent to those skilled in the art that other pore geometries can readily be fabricated as well. For example, long slits could be fabricated using the laser drilling approach of FIG. 6. For low-cost assembly, it is preferable to avoid critical alignments between the porous movable film 345 and plates 311 and 312. Preferred pore geometries are therefore translationally invariant with respect to plates 311 and 312, thereby avoiding any critical positioning of pores with respect to spacers 318. Translational invariance can be achieved by locating pores periodically on the membrane, as in FIG. 6, or randomly, as in FIGS. 5 and 7.

To quantify the dynamic operation of a display panel with a porous movable film, the pore geometry is taken to consist of circular pores located on a uniform square grid, similar to FIG. 6. It will be apparent to those skilled in the art that other geometries, for example those depicted in FIGS. 4, 5, and 7, are also capable of producing the desired dynamic response. The pores could also be highly asymmetric in shape. The mechanical resistance due to gas flow through the porous movable film 345 can be approximated by the expression $$R = \frac{12\mu_{\mathit{eff}}(P)}{N\pi}G(A)S^2\left(\frac{1}{h_1^3} + \frac{1}{h_2^3}\right),$$

where $$G(A) = \left(\frac{A}{2} - \frac{A^2}{8} - \frac{\ln A}{4} - \frac{3}{8}\right)$$

(see T. B. Gabrielson, *Mechanical-Thermal Noise in Micromachined Acoustic and Vibration Sensors*, IEEE Transactions on Electron Devices, Vol. 40, No. 5, May 1993, pgs. 903–909). Here N is the number of pores, S is the area of the porous movable film 345, A is the fractional total area covered with pores, herein referred to as pore area, and $h_1$ and $h_2$ are the separations between the porous movable film 345 in the unactuated state and plate 311 and 312, respectively. An effective pressure-dependent viscosity, $\mu_{\mathit{eff}}(P)$, is used to approximate the gas viscosity in the transitional flow regime encountered for most geometries of interest (see M. G. da Silva et al., Gas Damping and Spring Effects on MEMS Devices with Multiple Perforations and Multiple Gaps, Transducers '99, June 7–10, 1999, pgs. 1148–1151).

Figure 8A:
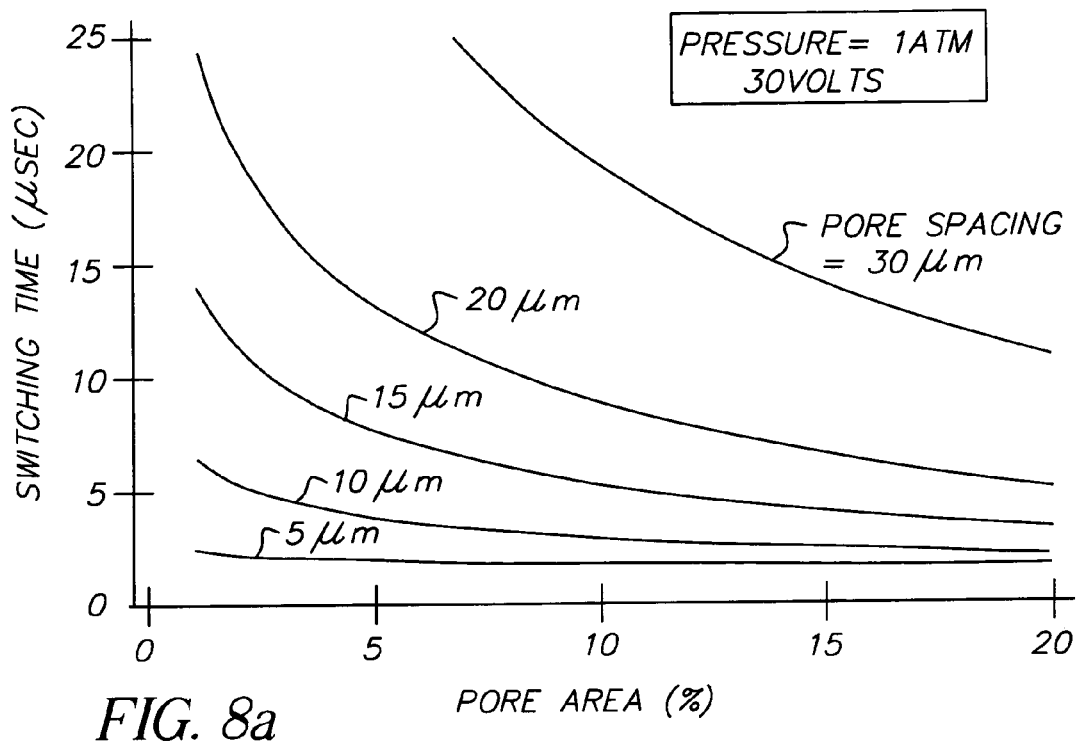
FIG. 8a shows plots of the switching time as a function of pore area at various pore spacings, for small pixel devices of the present invention.
Figure 8B:
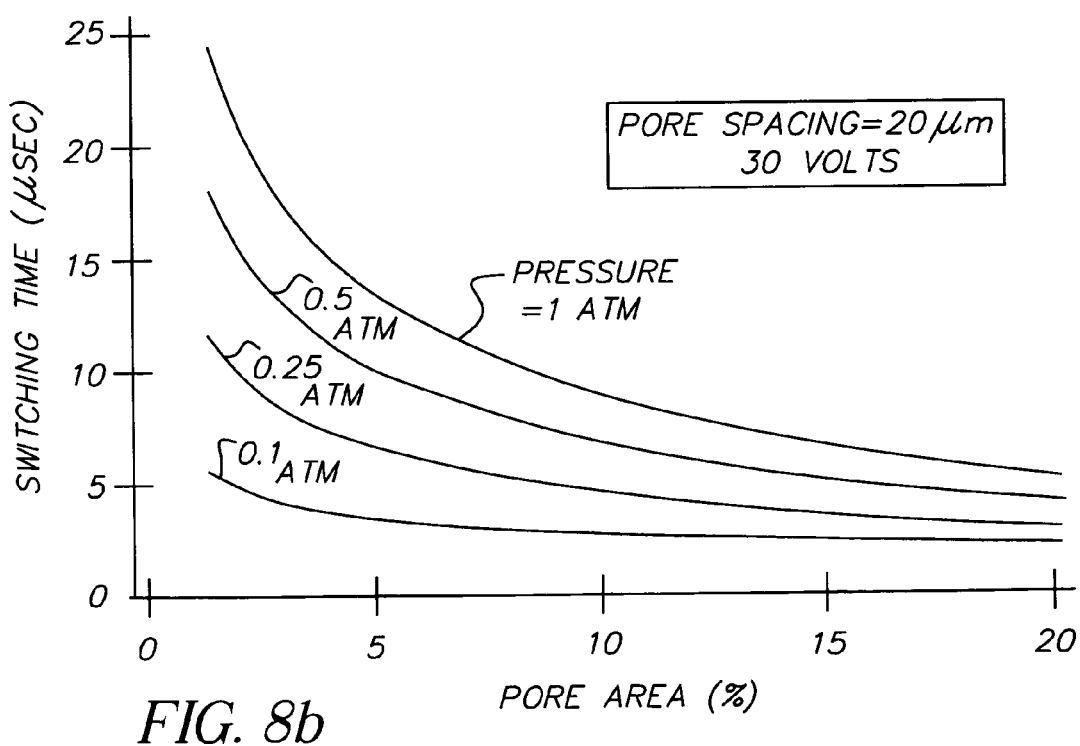
FIG. 8b shows plots of the switching time as a function of pore area at various device pressures, for small pixel devices of the present invention.
Figure 8C:
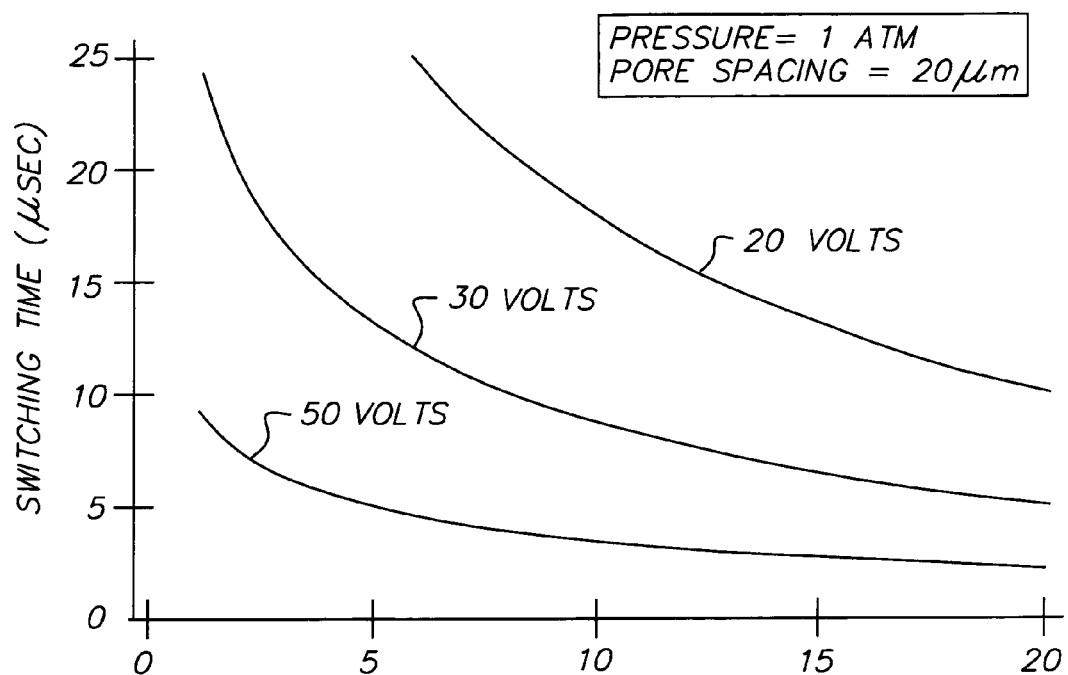
FIG. 8c shows plots of the switching time as a function of pore area at various applied voltages, for small pixel devices of the present invention.

FIGS. 8a, 8b, and 8c show calculated switching times for a display panel 310 having a porous movable film and a pixel size of 150 μm by 450 μm. As in FIGS. 1b, 1c, and 1d, porous movable film 345 is cellulose triacetate, with a thickness of 0.8 μm, that is separated from the top plate 311 and bottom plate 312 by 1 μm air-filled gaps. The insulating layers 313 are 1.5 μm of aluminum oxide. A potential difference is applied at time=0 between the thin transparent electrically conductive layer 315 on the porous movable film 345 and the conductive layer 314 on the top plate 311. The switching time is calculated assuming that the movable film 345 is initially in contact with the bottom plate 312 and that the thin transparent electrically conductive layer 315 is at the same potential as the conductive layer 316 on the bottom plate 312. As suggested by FIGS. 8a, 8b, and 8c, the electromechanical (and optical) performance of display panel 310 can be optimized by adjusting a number of controllable parameters, including pore area, pore spacing, pressure, and applied voltage.

The pore area occupied by pores 340 is defined in proportional relation to the surface area of the porous movable film. The pore area typically comprises less than 50% of the surface area of the porous movable film. To minimize the impact of the pores 340 on the optical performance of the display panel 310, the pore area is preferably less than 20%. In addition, the porous movable film 345 typically has a pore spacing, defined to be the center-to-center separation between neighboring pores, ranging from several microns to several tens of microns.

FIG. 8a shows the switching time of the porous movable film 345 as a function of pore area when the display is at atmospheric pressure and a 30 volt step is applied. The plots of FIG. 8a show that reasonable pore geometries are capable of producing switching times that are similar to those for pore-free movable films in highly evacuated atmospheres. For example, 3 μm pores with a pore spacing of 10 μm corresponds to a switching time of approximately 3 μsec, whereas in the evacuated pore-free display the switching time would be approximately 1.8 μsec (see FIG. 1d). By increasing the pore area or decreasing the pore spacing further, the porous movable film display can be made to switch as quickly as the evacuated pore-free display. Alternatively, as shown in FIG. 8b, by providing a relatively weak vacuum on the order of a tenth of an atmosphere, fast switching times are possible with relatively large pore spacing and relatively small pore areas. This weak vacuum could be provided by attaching a small-motorized gas pump (not shown) to the display panel 310, enabling the use of gas-permeable materials for plates 311 and 312; and for controlling pressure of any gas residing between the two spatially separated plates 311 and 312.

As shown in FIG. 8c, the switching time can be substantially modified by changing the applied voltage.

Figure 9:
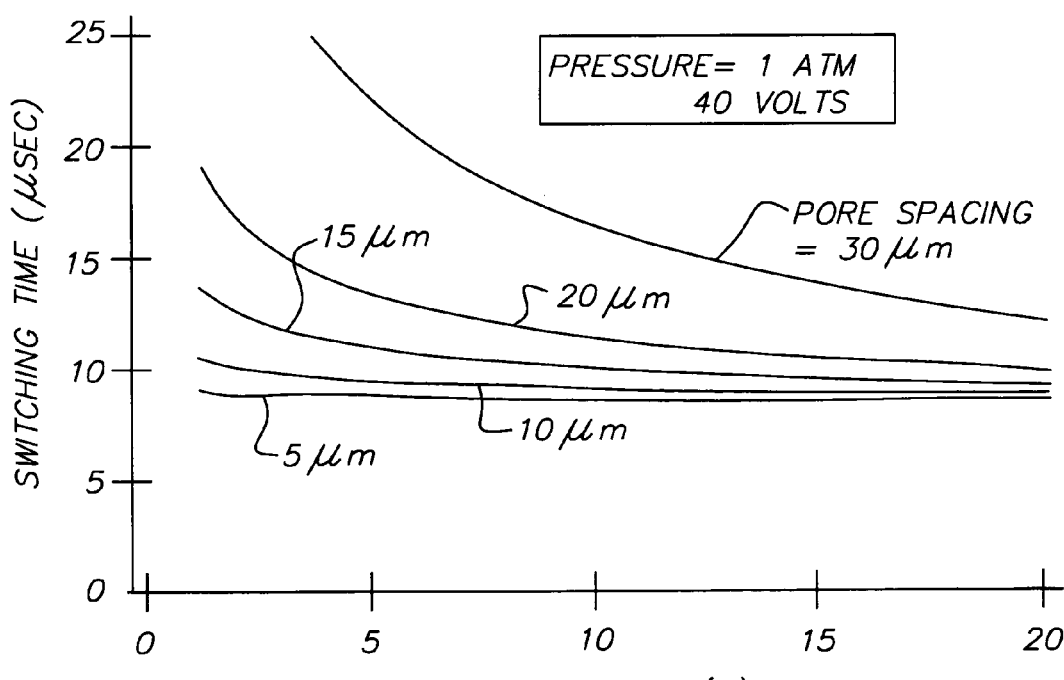
FIG. 9 shows plots of the switching time as a function of pore area at various pore spacings, for large pixel devices of the present invention.

For certain applications, such as signage, larger pixel sizes are preferred. FIG. 9 shows the calculated switching times of a porous movable film display at atmospheric pressure for 600 μm by 1800 μm pixels. The porous movable film 345 is now 1.6 μm thick and is separated from the top plate 311 and bottom plate 312 by 3 μm gaps. The insulating layers 313 are again 1.5 μm of aluminum oxide. It is seen that reasonable pore spacings and pore areas are capable of producing fast switching times for this case as well.

As described above, the movement of porous movable film 345 is controlled by electrostatic forces. These electrostatic forces are produced by applying an electrical potential between the conductive layer 315 on the porous movable film 345 and either one, or both, of the conductive layers 314 and 316 on plates 311 and 312. Alternate means for producing motion of the porous movable film can be employed. For example, the bending and tension of the movable film 345 can be optimized to produce a significant restoring force, eliminating the need for one of the two conductive layers 314 and 316 in certain applications.

The invention has been described in detail with particular reference to certain preferred embodiments thereof, but it will be understood that variations and modifications by those skilled in the art can be effected within the spirit and scope of the invention.

PARTS LIST 300 prior art display panel
310 display panel with porous movable film
311 rigid, transparent plate
312 rigid, transparent light guide plate
313 insulating layer
314 conductive layer
315 conductive layer
316 conductive layer
318 spacer
320 light source
322 emitted light
324 reflected light
326 compartment
328 deactivated compartment
335 solid, transparent movable film
340 pores
345 porous movable film
346 compartment
348 compartment
362 thickness
350 compartment
352 compartment
366 light scattering means

What is claimed is:

1. An electromechanical display panel with a plurality of pixels, comprising:
   a) at least two spatially separated plates;
   b) an organic polymeric, porous movable film having a defined pore area and suspended between the at least two spatially separated plates, and including a light modulating region containing a plurality of pores with a translationally-invariant pore structure, wherein the porous movable film is not aligned with respect to the plurality of pixels in the electromechanical display panel; and
   c) means for moving the porous movable film between the at least two spatially separated plates to cause selective light modulation within the light modulating region containing the plurality of pores.

2. The electromechanical display panel claimed in claim 1, wherein the translationally-invariant pore structure has a random pore placement.

3. The electromechanical display panel claimed in claim 1, wherein the translationally-invariant pore structure has a periodic pore placement.

4. The electromechanical display panel claimed in claim 1, wherein the translationally-invariant pore structure is microvoided, such that continuous air spaces connect from one surface of the porous movable film to an opposing surface of the porous movable film.

5. The electromechanical display panel claimed in claim 1, wherein the porous movable film is moved into contact with one of the at least two spatially separated plates at a potential difference less than 100 volts.

6. The electromechanical display panel claimed in claim 1, wherein the pore area comprises less than 20% of surface area of the porous movable film.

7. The electromechanical display panel claimed in claim 1, wherein a pore area comprises less than 5% of surface area of the porous movable film.

8. The electromechanical display panel claimed in claim 1, wherein a gas, having a pressure greater than 0.01 atmospheres, resides between the at least two spatially separated plates.

9. The electromechanical display panel claimed in claim 1, wherein a gas, having a pressure greater than 0.1 atmospheres, resides between the at least two spatially separated plates.

10. The electromechanical display panel claimed in claim 1, wherein a gas, having a substantially ambient pressure, resides between the at least two spatially separated plates.

11. The electromechanical display panel claimed in claim 1, further comprising:
   d) a gas pump for controlling pressure of a gas residing between the at least two spatially separated plates.

12. The electromechanical display panel claimed in claim 1, wherein the porous movable film has a pore spacing less than 30 microns.

13. The electromechanical display panel claimed in claim 1, wherein the porous movable film has a pore spacing less than 15 microns.

14. The electromechanical display panel claimed in claim 1, wherein the porous movable film has a pore spacing between 2 and 10 microns and a pore area comprising between 1 and 10% of surface area of the porous movable film.

15. The electromechanical display panel claimed in claim 1, wherein one of the at least two spatially separated plates is a light guide.

16. The electromechanical display panel claimed in claim 1, wherein the porous movable film has circular pores.

* * * * *